United States Patent
Jansen et al.

(10) Patent No.: US 9,722,216 B2
(45) Date of Patent: Aug. 1, 2017

(54) ENERGY STORAGE DEVICE AND METHOD

(75) Inventors: Patrick Jansen, Schenectady, NY (US); Henry Todd Young, Erie, PA (US)

(73) Assignee: General Electric Company, Schenectady, NY (US)

( * ) Notice: Subject to any disclaimer, the term of this patent is extended or adjusted under 35 U.S.C. 154(b) by 1312 days.

(21) Appl. No.: 13/551,767

(22) Filed: Jul. 18, 2012

(65) Prior Publication Data

US 2014/0023894 A1    Jan. 23, 2014

(51) Int. Cl.
*H01M 10/6557* (2014.01)
*H01M 2/02* (2006.01)
*H01M 2/10* (2006.01)
*H01M 10/625* (2014.01)
*H01M 10/647* (2014.01)
*H01M 10/6561* (2014.01)
*H01M 10/613* (2014.01)
*H01M 10/0525* (2010.01)

(52) U.S. Cl.
CPC ....... *H01M 2/0245* (2013.01); *H01M 2/1077* (2013.01); *H01M 2/1094* (2013.01); *H01M 10/613* (2015.04); *H01M 10/625* (2015.04); *H01M 10/647* (2015.04); *H01M 10/6557* (2015.04); *H01M 10/6561* (2015.04); *H01M 10/0525* (2013.01); *Y10T 29/4911* (2015.01); *Y10T 29/49108* (2015.01)

(58) Field of Classification Search
CPC ........... H01M 10/6556; H01M 2/0469; H01M 10/6557
See application file for complete search history.

(56) References Cited

U.S. PATENT DOCUMENTS

| 3,282,739 A | 11/1966 | Hennigan |
| 4,112,922 A | 9/1978 | Skinner et al. |
| 4,383,013 A | 5/1983 | Bindin et al. |
| 5,456,994 A | 10/1995 | Mita |
| 6,448,741 B1 | 9/2002 | Inui et al. |

(Continued)

FOREIGN PATENT DOCUMENTS

| EP | 2228851 A1 | 9/2010 |
| JP | H05343105 A | 12/1993 |

(Continued)

OTHER PUBLICATIONS

Search Report and Written Opinion from corresponding PCT Application No. PCT/US2013/047497 dated Sep. 4, 2013.

(Continued)

*Primary Examiner* — Maria J Laios
(74) *Attorney, Agent, or Firm* — Global Patent Operation; John A. Kramer

(57) ABSTRACT

An energy storage device that includes a housing, which includes at least one end panel that includes at least one aperture therethrough. The device further includes a battery cell housed in the housing. The battery cell includes mutually opposed first and second faces joined at their edges. The device also includes a heat sink adjacent to the battery cell and in thermal contact with the first face of the battery cell. The heat sink defines at least one cooling medium passage extending parallel to the face of the adjacent battery cell. The cooling medium passage opens onto the at least one aperture formed through the at least one end panel of the housing.

10 Claims, 7 Drawing Sheets

(56) References Cited

U.S. PATENT DOCUMENTS

| | | | |
|---|---|---|---|
| 6,709,783 B2 | 3/2004 | Ogata et al. | |
| 6,819,561 B2 | 11/2004 | Hartzell et al. | |
| 7,141,331 B2 | 11/2006 | Ziegler et al. | |
| 7,351,493 B2 | 4/2008 | Uemoto et al. | |
| 7,704,620 B2 | 4/2010 | Schaefer et al. | |
| 8,785,025 B2 | 7/2014 | Sohn | |
| 2005/0191546 A1* | 9/2005 | Jeon | H01M 2/0215 429/127 |
| 2006/0204840 A1* | 9/2006 | Jeon | H01M 2/1077 429/152 |
| 2009/0123819 A1* | 5/2009 | Kim | H01M 2/105 429/120 |
| 2011/0052960 A1* | 3/2011 | Kwon | H01M 10/0481 429/120 |
| 2011/0189521 A1 | 8/2011 | Lee et al. | |
| 2012/0021270 A1 | 1/2012 | Kumar et al. | |
| 2013/0302651 A1* | 11/2013 | Kim | H05K 1/148 429/7 |

FOREIGN PATENT DOCUMENTS

| | | |
|---|---|---|
| JP | 2004-031195 A | 1/2004 |
| JP | 2008-016263 A | 1/2008 |
| JP | 2009099445 A | 5/2009 |
| JP | 2010282767 A | 12/2010 |
| JP | 2011090830 A | 5/2011 |
| JP | 2012018910 A | 1/2012 |
| JP | 2012043655 A | 3/2012 |
| JP | 2012252898 A | 12/2012 |

OTHER PUBLICATIONS

Notice of Rejection for corresponding JP Patent Application No. 2015-523100 dated May 16, 2017.

Unofficial English translation of Japanese Search Report issued in connection with corresponding JP Application No. 2015-523100 dated Jan. 31, 2017.

Unofficial English translation of Office Action issued in connection with corresponding JP Application No. 2015-523100 dated Feb. 7, 2017.

* cited by examiner

ENERGY STORAGE DEVICE AND METHOD

BACKGROUND

Technical Field

Embodiments of the invention relate generally to energy storage devices. Certain embodiments relate to sealed, ventilated energy storage devices.

Discussion of Art

Lithium-ion ("Li-ion") rechargeable batteries are widely used as they offer relatively high energy densities and good recharge rates. One particular application for these batteries is in vehicles having regenerative braking systems, such as hybrid haul trucks and other hybrid off-highway vehicles ("OHVs") that are used for surface mining operations, underground mining operations, or the like.

Hybrid OHV applications require a battery technology capable of very high charge rates and simultaneously high capacity of energy storage. Currently, Li-ion battery technology is the only technology capable of meeting the high charge rates and maintaining sufficient life. Unfortunately, high charge rates can produce high internal resistive ($I^2R$) losses in the battery, which must be dissipated to prevent the battery cells from overheating. Maximum cell operating temperatures for Li-ion is typically 55-65 deg C., however the maximum ambient temperatures in which OHV trucks operate can reach 55 deg C., with the majority of operation in ambient temperatures reaching 45 deg C. As a result, there is very little thermal headroom available between the cell temperature and maximum ambient temperature.

Known cooling approaches for Li-ion cells include liquid cooling and indirect air ventilation. In general, liquid cooling is not preferred for OHV applications due to potential failure modes resulting in loss of cooling medium (e.g., water or liquid coolant leaks). Typically, the liquid cooling approach has involved aluminum or copper plates sandwiched between individual Li-ion cells. At least one cold plate (with liquid cooling pipes) is then closely attached to at least one surface of each sandwiched plate to conduct heat. Heat dissipated within the cells is first conducted to the sandwiched plates, and then carried via the plates to the liquid-cooled cold plate, or plates. A liquid cooling medium then carries the heat to a heat exchanger where the heat is ultimately dissipated into the ambient air. In indirect ventilated systems, aluminum or copper plates are similarly sandwiched between cells. The liquid-cooled cold plate is replaced by one or more finned heat sinks. In both approaches, the cold plate or heat sink limits the achievable energy density of the cooled energy storage device.

Therefore, it is desirable to have a cooled energy storage device with higher energy density than has been achieved using the known modes of cooling.

BRIEF DESCRIPTION

An embodiment of the present invention relates to an energy storage device that includes a housing including at least one end panel that includes at least one aperture therethrough. The device further includes a battery cell housed in the housing, the battery cell having mutually opposed first and second faces joined at their edges. The device also includes a heat sink adjacent to the battery cell and in thermal contact with the first face of the battery cell. The heat sink defines at least one cooling medium passage extending parallel to the first face of the battery cell. The cooling medium passage opens the at least one aperture formed through the at least one end panel of the housing.

Another embodiment of the invention relates to an energy storage device comprising a housing. The housing includes opposed first and second end panels. The end panels are substantially parallel to one another. The first end panel defines a first plurality of slots and the second end panel defines a second plurality of slots. The first and second pluralities of slots are aligned with each other. Plural battery modules are housed in the housing. The battery modules comprise plural battery cells having respective first and second side edges, and plural heat sinks interleaved between the plural battery cells and in thermal contact with the cells. The heat sinks define a plurality of cooling medium passages having first and second cooling medium passage openings at respective first and second ends of the heat sinks, which extend past the first and second side edges of the battery cells. An encapsulant encloses at least portions of at least one of the battery cells or the heat sinks. The first and second ends of the heat sinks are disposed in the first plurality of slots and in the second plurality of slots, respectively, so that the slots support the battery modules.

Another embodiment of the invention relates to an energy storage device, which includes a housing, a battery cell housed in the housing, and a heat sink adjacent to the battery cell. The heat sink is in thermal contact with a face of the battery cell. The heat sink defines a plurality of cooling medium passages extending parallel to the face of the battery cell. The cooling medium passages open through the housing. An encapsulant covers at least part of at least one of the battery cell or the heat sink.

Another embodiment of the invention relates to a battery assembly comprising a first energy storage device and a second energy storage device. The first energy storage device has a first plurality of cooling medium passages formed therethrough, and the second energy storage device has a second plurality of cooling medium passages formed therethrough. The first energy storage device and the second energy storage device are positioned with the first and second pluralities of cooling medium passages in mutual alignment such that air may flow through the first and second pluralities of cooling medium passages.

Another aspect of the invention relates to making an energy storage device by stacking a battery cell with an array of heat sinks defining cooling medium passages with a face of the battery cell contacting a face of the corresponding array of heat sinks. The stacked battery cell and heat sinks are then enclosed within a housing having apertures for air flow that are aligned with open ends of the cooling medium passages.

The terms "substantially" and "about", as used herein, are intended to indicate conditions within reasonably achievable manufacturing and assembly tolerances, relative to ideal desired conditions suitable for achieving the functional purpose of a component or assembly.

DRAWINGS

The present invention will be better understood from reading the following description of non-limiting embodiments, with reference to the attached drawings, wherein below:

DETAILED DESCRIPTION

Figure 1:
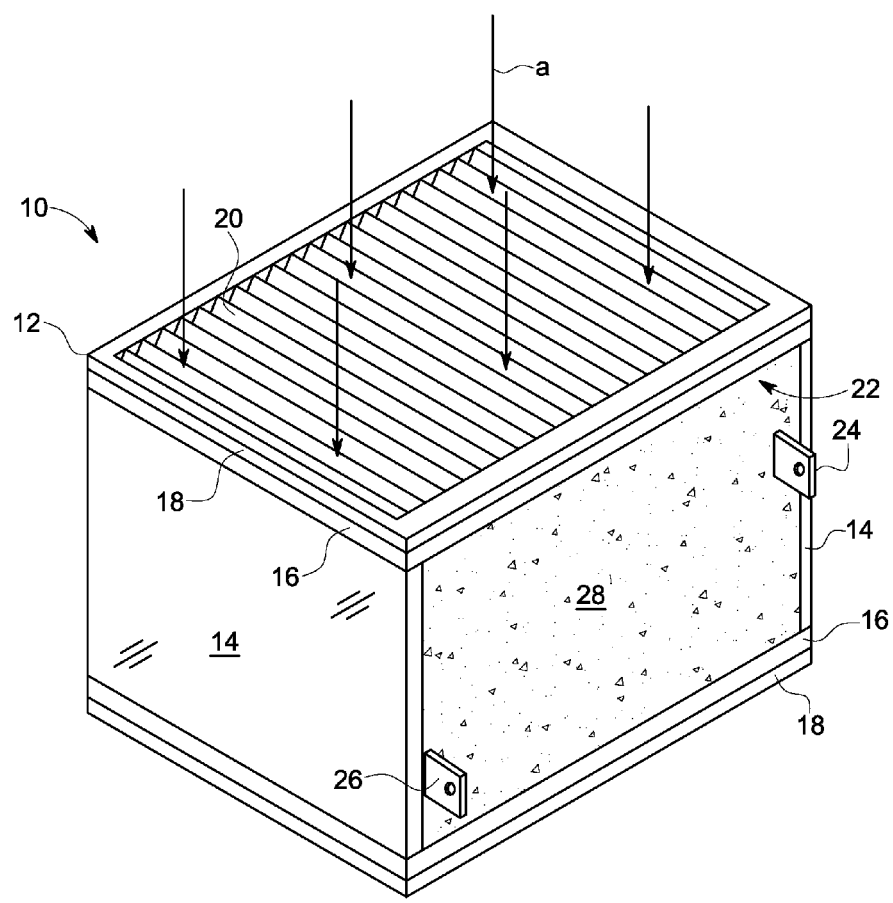
FIG. 1 is a perspective view of a direct ventilated sealed energy storage device, according to an embodiment of the present invention.

Reference will be made below in detail to exemplary embodiments of the invention, examples of which are illustrated in the accompanying drawings. Wherever possible, the same reference characters used throughout the drawings refer to the same or like parts. Although exemplary embodiments of the present invention are described with respect to off-highway vehicles, embodiments of the invention are also applicable for use in power storage devices, generally.

Embodiments of the invention relate to a direct ventilated energy storage device in which battery cells are sealed from the environment. FIG. 1 shows an energy storage device 10, according to an exemplary embodiment. The device 10 includes battery cells (not shown) located with a housing 12. The housing 12 includes several side panels 14 as well as end panels 16 and cover panels 18. The cover panels include louvers or air guides 20 for guiding ventilating air flows a through the energy storage device with minimal pressure drop. The side panels 14 and the end panels 16 define an open side 22 of the housing, from which positive and negative power terminals 24, 26 protrude. The open side of the housing is filled with an encapsulant 28, which surrounds the power terminals and seals the cells of the energy storage device away from the environment surrounding the housing. The encapsulant may be any number of epoxy encapsulating resins or potting compounds commonly used in electrical applications, such as the low viscosity resins Dow D.E.R.™ 732 or 736.

Figure 2:
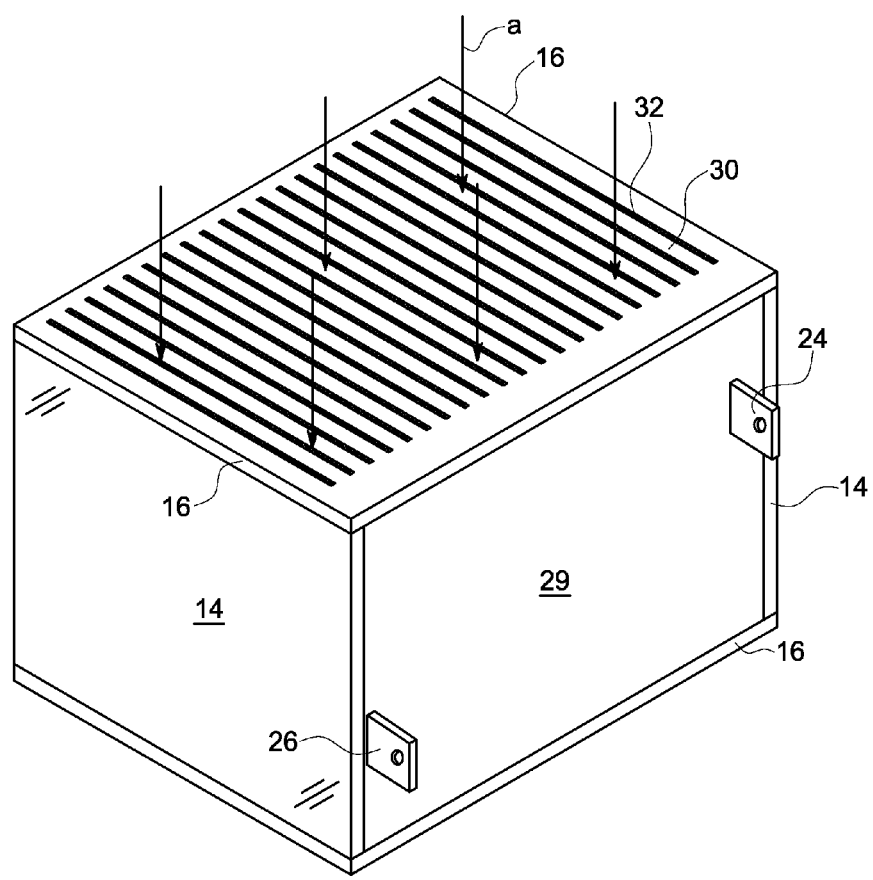
FIG. 2 is a perspective view of the energy storage device shown in FIG. 1 with end panels removed.

Alternatively, FIG. 2 shows a removable faceplate 29, which is fastened over the open side of the housing. The faceplate includes through holes for sealingly sliding over the power terminals.

Figure 3:
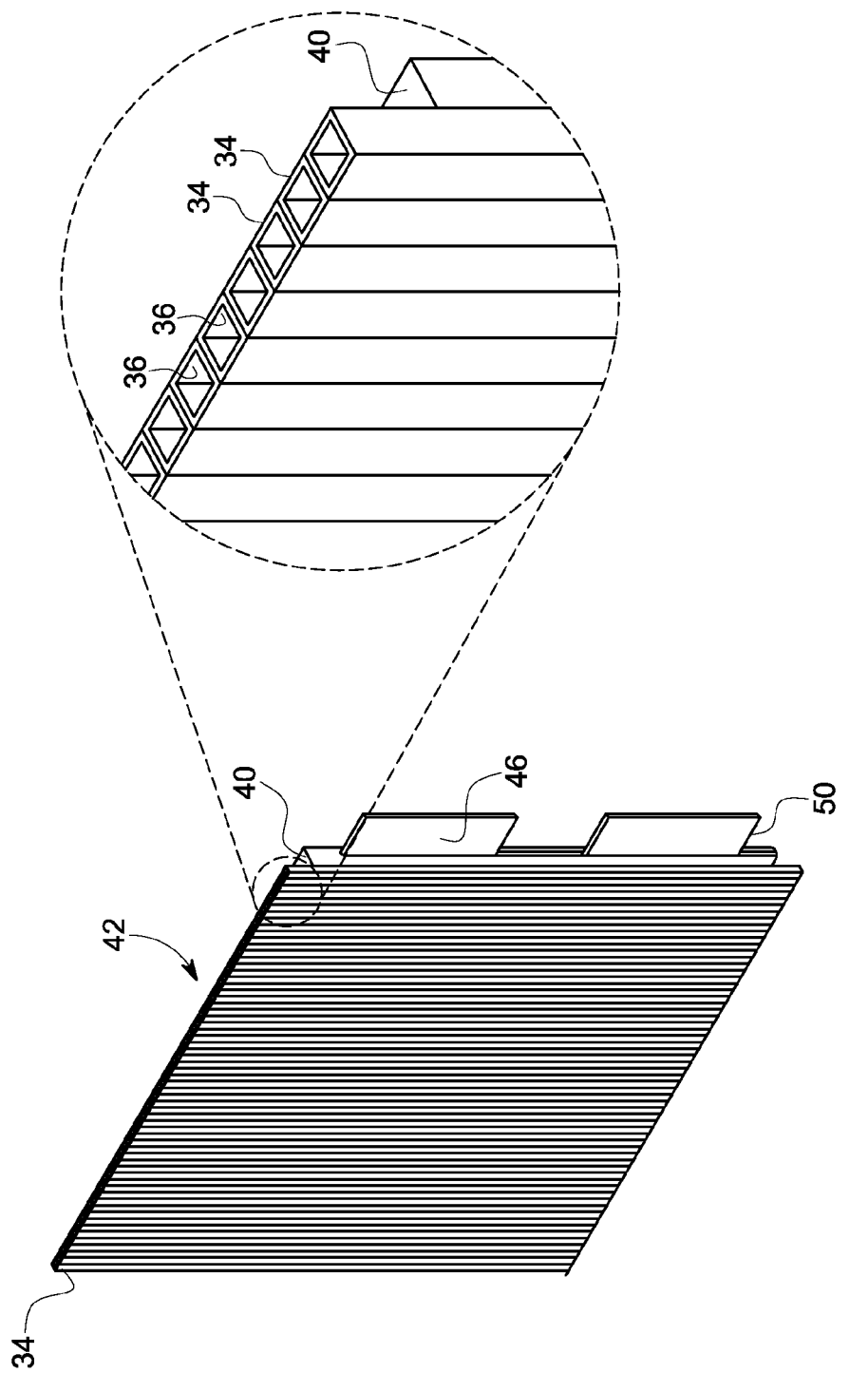
FIG. 3 is a perspective exploded assembly view of a battery module of the energy storage device shown in FIGS. 1 and 2.

Referring to FIGS. 2 and 3, the cover panels 18 can be removed to reveal the end panels 16, which include bars 30 defining apertures 32 which, in an embodiment, are slots. Each slot or other aperture 32 is aligned with the ends of numerous tubular heat sinks 34, which are arranged in a linear array along the slot. In the embodiment shown, the ends of at least some of the heat sinks are engaged into the slots 32, thereby supporting the heat sinks within the housing 12. The heat sinks are shown side-by-side, and essentially connected to each other, however, gaps may be present between adjacent heat sinks without departing from the present invention.

FIG. 3 shows that each of the tubular heat sinks 34 defines a cooling medium passage 36 for receiving a flow of cooling medium such as air. Gaps between adjacent heat sinks also may define cooling medium passages 36. Each array of heat sinks 34 is located proximate, or fastened to, a face of a battery pouch cell 40 to form a battery module 42. A "pouch cell" is a type of battery cell in which the electrolyte is enclosed by a deformable and flexible membrane, by contrast to a "prismatic cell" in which the electrolyte is enclosed within a rigid case. For example, an Li-ion pouch cell that is rated at 60Ah, 2.25vdc, may be provided with a total of fifty four (54) tubular heat sinks, each tube being nominal 3/16" (4.8 mm) square with 0.014" (0.36 mm) wall thickness. Each heat sink 34 in the array is shown in thermal contact with the face of the pouch cell 40. Thus, air flowing through the cooling medium passages 36 can receive heat from the pouch cell 40 through the relatively thin walls of the heat sinks 34, thereby rapidly diffusing heat generated within the battery module 42. Additionally, each heat sink protrudes beyond the adjacent battery cell so as to be engaged into one of the slots 32 formed in the end panels 16, thereby supporting both the heat sinks and the battery pouch cells 40 within the housing 12. This arrangement is particularly advantageous in embodiments where the battery cell walls are relatively weak, as for Li-ion pouch cells. Moreover, it should be noted that even where gaps are present between adjacent heat sinks 34, the heat sinks nonetheless can provide sufficient structural support at least so long as the gap widths do not exceed the size of the heat sink tubes.

The tubular heat sinks are manufactured from extruded aluminum, but may also be of other materials including, but not limited to, copper and polymers. Additionally, the cooling medium passage 36 in the tubular heat sink may have a square or rectangular cross-section, but may also have cross-sections of other shapes including circular and oval. Furthermore, the tubular heat sink may be comprised of multiple tubes with multiple cooling passages combined into a single extrusion, thereby reducing the number of individual heat sinks in contact with the face of the pouch cell 40 to a low number, including one (1).

Figure 4:
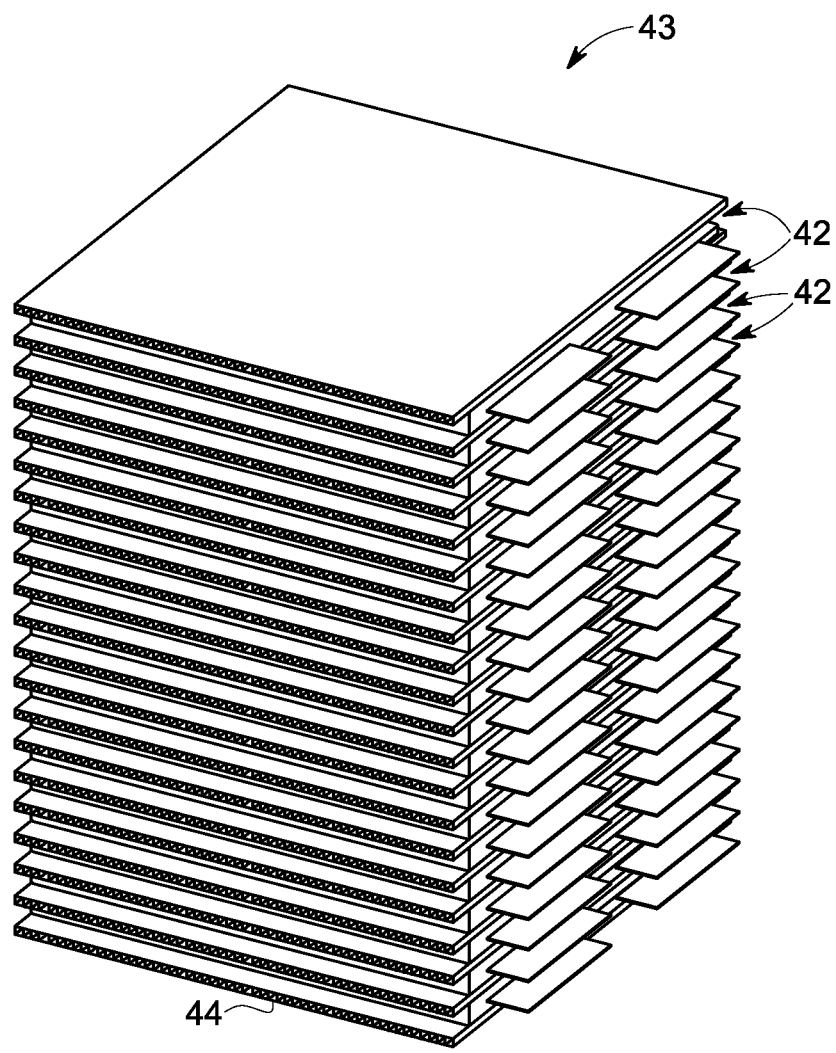
FIG. 4 is a perspective view of a stack of multiple battery modules for making the energy storage device shown in FIGS. 1 and 2.
Figure 5:
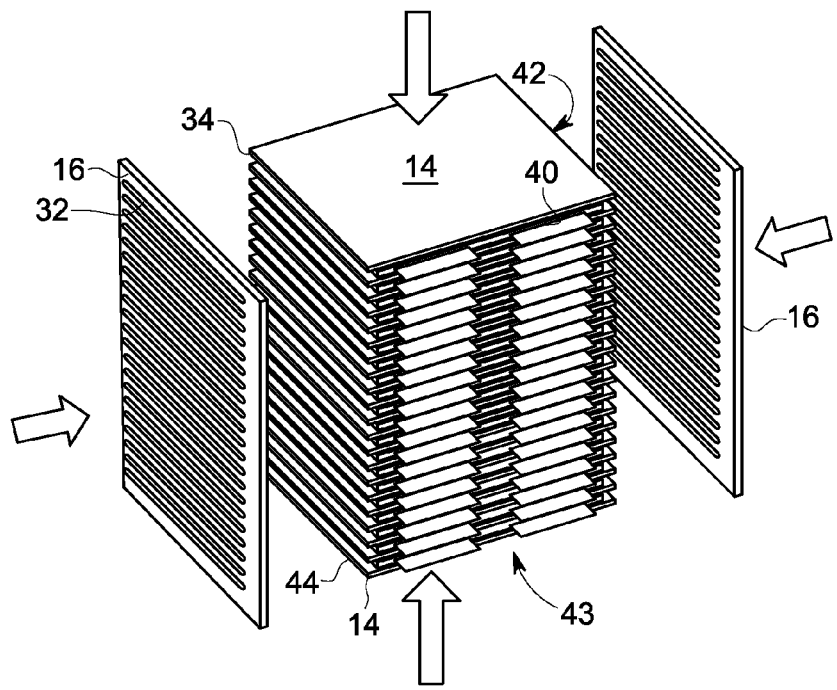
FIG. 5 is a perspective view of the stack of FIG. 4 in which the battery modules have been compressed and secured.
Figure 6:
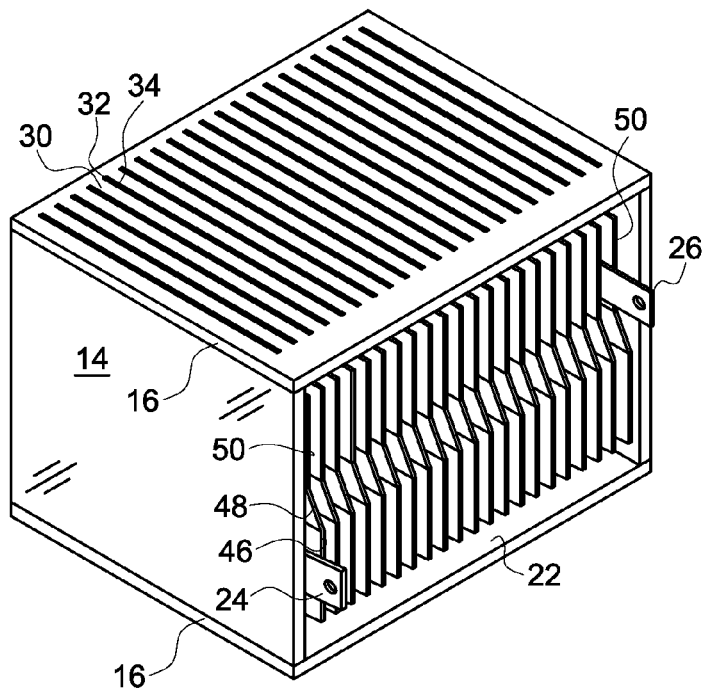
FIG. 6 is a perspective view of the stack of battery modules of FIGS. 4-5, in which the modules have been electrically connected and enclosed.

Referring to FIGS. 4-6, according to an embodiment of the present invention, a sealed direct-ventilated energy storage device is formed by stacking together numerous battery modules 42. For example, twenty (20) battery modules are stacked together to form a battery module stack 43 with an additional layer of heat sinks 44 added to one end of the stack (top or bottom) such that both large-area faces of all pouch cells 38 are in contact with heat sinks (FIG. 4). The stack then is compacted or squeezed together. It is to be noted that within the stack 43, each cell 40 is sandwiched between two layers of heat sinks 34. Simultaneously, each layer of heat sinks 34 is sandwiched between two cells 40, with the exception of the heat sinks at the top and bottom of the stack, which have cells only on one side.

A temporary adhesive can be used to fasten the heat sinks 34 to the cell 38 during assembly of the modules 42, and then between modules during stacking to form the pack 10. Such an adhesive can be selected for high thermal conductivity, e.g., 3M™ TC-2707 or TC-2810 or the like. Alternatively, a temporary assembly jig can be utilized (not shown) to align and hold the heat sinks and cells during module assembly and stacking While the stack of battery cells 40 and heat sinks 34 is compressed to less than its preassembly thickness, the slots or apertures 32 of the end panels 16 are slid over the protruding heat sinks 34 (FIG. 5). Each aperture 32 is spaced apart from its neighboring apertures by a distance less than the combined preassembled thickness of a pouch cell 40 and a heat sink 34. The end panels 16 thereby hold together the battery modules 42, maintain stack compression, and provide structural support for the pouch cells 40. For example, the battery cells may be compressed to less than about 99% of preassembled thickness, or to no less than about 95% of preassembled thickness. In some embodiments, at least one of the heat sinks mechanically engages the end panels to support the plurality of battery cells within the housing.

Once the end panels have been assembled to hold the stack together, then, as shown in FIG. 6, a positive electrode 46 of each pouch cell is electrically connected by a jumper 48 to a negative electrode 50 of an adjacent pouch cell, or to the positive power terminal 24. Additionally, one or more of the negative electrodes 50 is electrically connected to the negative power terminal 26. The side panels 14 then can be assembled with the end panels 16 and cover panels 18, forming the housing 12 with at least one open side 22, as shown in FIG. 7.

Figure 7:
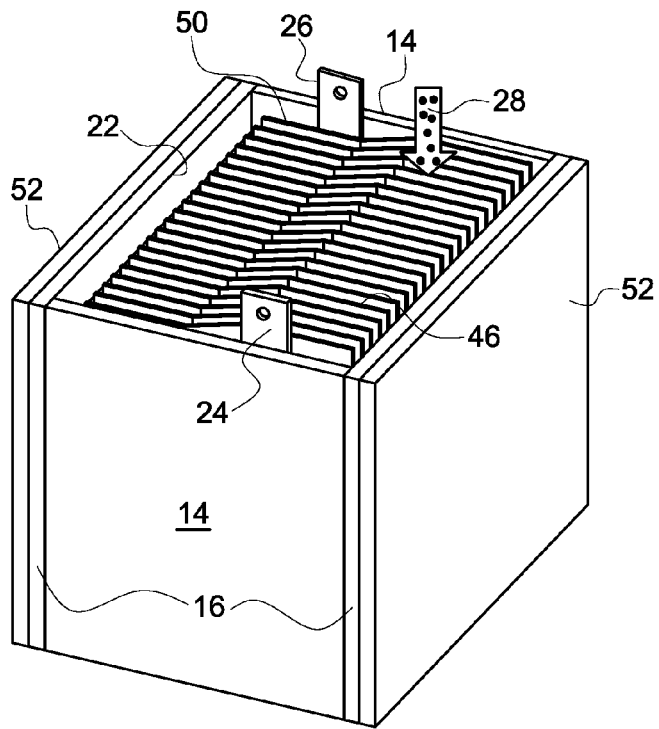
FIG. 7 is a perspective view of a step of encapsulating the stack of battery modules shown in FIGS. 4-6.

FIG. 7 further shows a step of encapsulating the pouch cells 40 at the open side 22 of the housing 12. Temporary covers 52 are placed over the slots 32 of the end panels 16, in order to prevent the encapsulant resin 28 from entering the cooling medium passages 36. Once solidified, the encapsulant resin provides additional structural support to the pouch cells 40 and electrically insulates the electrodes 46, 50.

Figure 8:
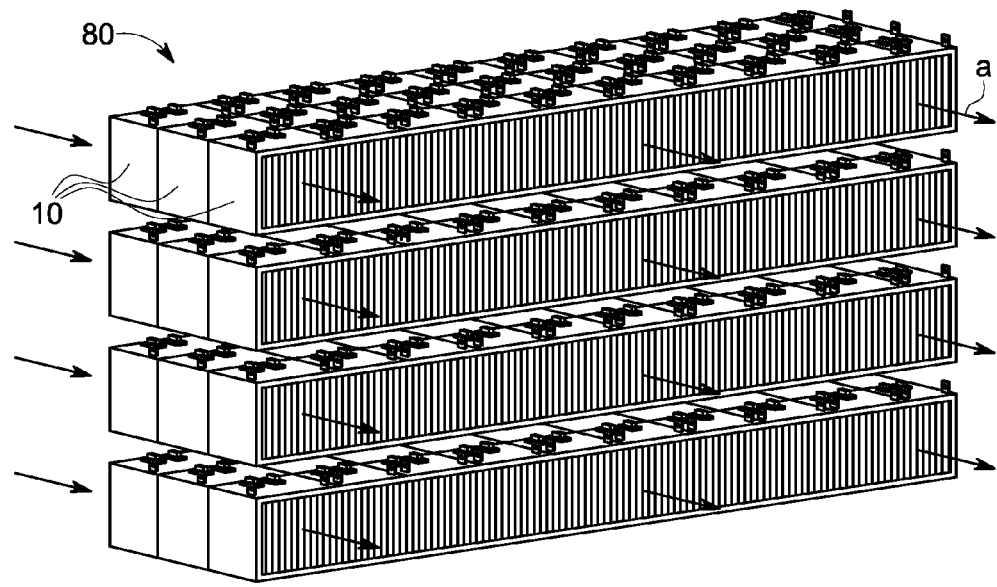
FIG. 8 is a perspective view of a horizontally ventilated battery system including multiple energy storage devices according to an embodiment of the present invention.

FIG. 8 shows an embodiment 80 featuring a horizontal air flow αin which several planar arrays of energy storage devices 10 are stacked together with the air guides 20 opening to the left and to the right. Air flow αenters the system at left, flows through three energy storage devices 10 in series, and exits the system at right. The air guides 20 may have a somewhat triangular cross-section to split and guide airflow αthrough the energy storage device 10 without significant pressure drop. Within each energy storage device, the inner walls of the heat sinks provide a substantial surface area for convective heat removal. Thus, heat generated within each battery cell diffuses directly through the adjacent heat sinks into the moving air. For example, in a 48V, 60 Ah, 2.7 kWh energy storage device, containing 20 battery cells, the total mass is 55 kg with an energy density of 49 Wh/kg. In an embodiment, the thermal resistance from each cell to ambient, taking into account the relatively large convective area within the heat sinks, is sufficiently low such that the internal cell temperature will not exceed 65 deg C. in 55 deg C. ambient conditions, during a continuous charge/discharge of 360 A. In an embodiment, the energy storage device has an energy density in excess of about 40 Wh/kg.

Figure 9:
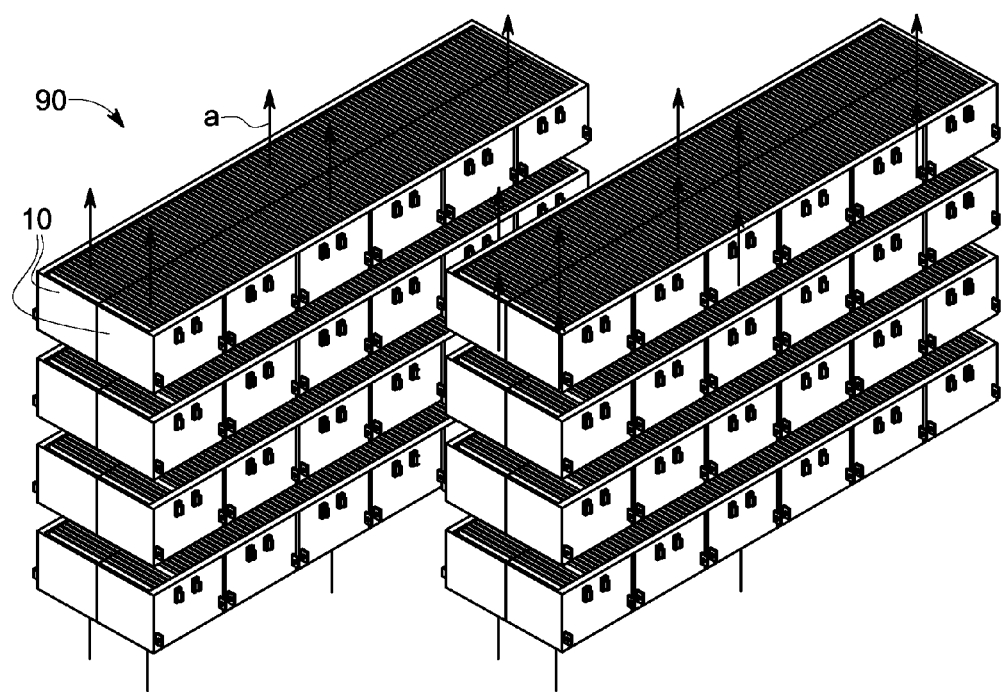
FIG. 9 is a perspective view of a vertically ventilated battery system including multiple energy storage devices according to an embodiment of the present invention.

FIG. 9 depicts an embodiment 90 with a vertical air flow αin which energy storage devices 10 are stacked together with the air guides 20 opening upward and downward. Air flow αenters the system at bottom, flows upward through four energy storage devices in series, and exits the system at top. Air flow αcan be provided by natural convection (as in FIG. 9), or by forced convection such as an electric blower, fan, or the like.

Figure 10:
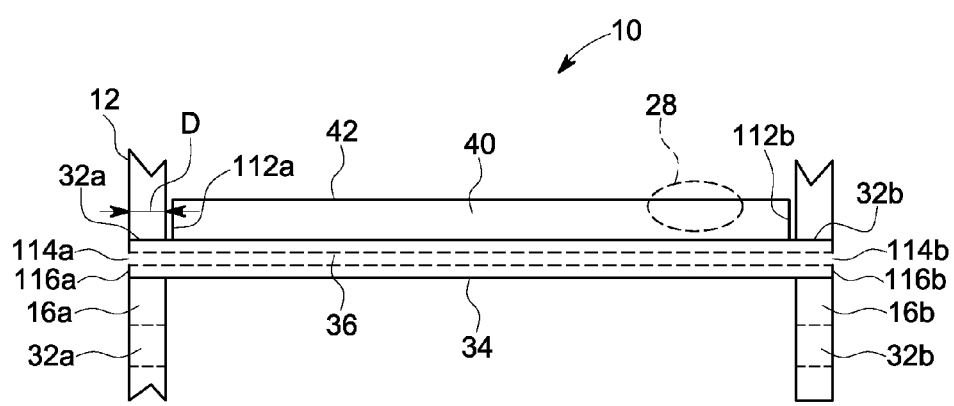
FIG. 10 is a cross-sectional schematic view of an energy storage device, not necessarily to scale, according to an embodiment.

In another embodiment, with reference to FIG. 10, an energy storage device 10 comprises a housing 12 and plural battery modules 42 housed in the housing. The housing comprises opposed first and second end panels 16a, 16b. The first and second end panels are substantially parallel to one another. (Meaning parallel but for manufacturing and assembly tolerances.) The first end panel defines a first plurality of parallel slots 32a and the second end panel defines a second plurality of parallel slots 32b. The first plurality of parallel slots is aligned with the second plurality of parallel slots. The battery modules 42 (only one of the plurality of battery modules is shown in FIG. 10) comprise plural battery cells 40 having respective first and second side edges 112a, 112b. The battery modules further comprise plural heat sinks 34 interleaved between the plural battery cells and in thermal contact with the cell. (Interleaved means the heat sinks are sandwiched between adjacent cells, e.g., a first cell then a first heat sink then a second cell then a second heat sink and so on.) The heat sinks 34 define a plurality of parallel cooling medium passages 36 having first and second distal cooling medium passage openings 114a, 114b. (The passages 36 may be square or otherwise rectangular in lateral cross section; the heat sinks may be aluminum.) First and second distal ends 116a, 116b of the heat sinks, coterminous with the first and second distal cooling medium passage openings, respectively, extend past the side edges 112a, 112b of the battery cells (see distance "D"). The first and second distal ends 116a, 116b of the heat sinks are disposed in the first plurality of parallel slots 32a and in the second plurality of parallel slots 32b, respectively, whereby the battery modules are supported by the slots. The device 10 may further comprise an encapsulant 28 (shown schematically in FIG. 10) enclosing at least portions of the battery cells.

As noted above, embodiments of the invention relate to direct-ventilated energy storage devices. In a direct-ventilated energy storage device, heat is transferred from the cells of the device by passing air (or another coolant medium) through passageways of heat sinks located adjacent and in thermal contact with the cells. That is, for each cell, there is a respective heat sink in thermal contact with the cell, with heat passing from the cell to the heat sink and then to air passing through internal passages of the heat sink. In contrast, conventional indirect ventilated energy storage devices utilize external, finned heat sinks in conjunction with thermally-conductive plates. Heat generated within the batteries can only be diffused across the plates to the fins, which offer a relatively limited surface area for convective heat removal. For a 48V, 60 Ah, 2.7 kWh conventional energy storage device, containing 20 batteries, the total mass is 70-80 kg with an energy density of 34-39 Wh/kg. Yet the thermal resistance from each cell to ambient, taking into account the conduction distance across each conductive plate and the relatively small convective area of the fins, is more than 20% above the thermal resistance expected for the direct ventilated cells.

Accordingly, a direct ventilated energy storage device, according to embodiments of the present invention, offers the advantages of lower weight (e.g., 20-35% lower than indirect ventilated packs of the same energy content) and improved cooling compared to the known devices. Lower battery weight provides increased productivity and fuel economy benefits by increasing payload in mine haul trucks compared to known devices. The improved cooling reduces the temperature rise of the battery cells relative to the ambient temperature (for the same cooling power), thereby enabling the battery charge and discharge rates to be increased when thermally limited. The direct ventilation further improves cooling by reducing the thermal gradients across individual cells such that the maximum (hot-spot) temperature of each cell is considerably closer to the average cell temperature than for indirect ventilated cells, thereby further increasing the power capability of the cells.

The improved cooling is particularly advantageous in OHV mining applications, in which a large market segment is in high ambient temperature environments.

In one embodiment of the present invention, an energy storage device includes a housing, which includes at least one end panel that includes at least one aperture therethrough. The device further includes a battery cell housed in the housing. The battery cell includes mutually opposed first and second faces joined at their edges. The device also includes a heat sink adjacent to the battery cell and in thermal contact with the first face of the battery cell. The heat sink defines at least one cooling medium passage extending parallel to the first face of the battery cell. The cooling medium passage opens onto the at least one aperture formed through the at least one end panel of the housing.

In select embodiments, the housing further includes a cover panel fastened over the end panel of the housing. The cover panel includes at least one air guide aligned with the at least one aperture of the end panel. In some embodiments, the battery cell includes a negative electrode and a positive electrode disposed at an open side of the housing. In certain embodiments, the energy storage device also includes an encapsulant deposited at the open side of the housing to cover at least the electrodes of the battery cell. The battery cell may be a first battery cell of a plurality of battery cells housed in the housing, with the heat sink being a first heat sink of a plurality of heat sinks respectively adjacent to the plurality of battery cells. Electrodes of the plurality of battery cells may be electrically interconnected in series or in parallel or in combination thereof. In certain embodiments, a negative terminal may be electrically connected to a negative electrode of the first battery cell; and a positive terminal may be electrically connected to a positive electrode of a second cell of the plurality of battery cells. An encapsulant may be deposited at the open side of the housing to cover at least the electrodes of the plurality of battery cells, the negative terminal and the positive terminal protruding through the encapsulant. Alternatively, a faceplate may be fastened over the open side of the housing with the negative terminal and the positive terminal protruding through the faceplate. In some embodiments, a plurality of battery cells may be pouch cells interposed between and attached to a plurality of heat sinks. In some embodiments, at least one of the heat sinks mechanically engages the end panel to support the plurality of battery cells within the housing. In select embodiments, each heat sink mechanically engages a corresponding aperture of the end panel, the apertures being successively spaced at a distance less than the combined thickness of a heat sink and a battery cell, such that the end panel holds the plurality of battery cells in compression. For example, the battery cells may be compressed to less than about 99% of preassembled thickness. In an embodiment, the energy storage device has an energy density in excess of about 40 Wh/kg.

A plurality of energy storage devices may be assembled into a battery assembly, arranged such that air flows first through the cooling medium passages of a first one of the plurality of energy storage devices, then through the cooling medium passages of a second one of the plurality of energy storage devices.

Another embodiment of the invention relates to a housing including opposed first and second end panels. The first and second end panels are substantially parallel to one another. The first end panel defines a first plurality of slots and the second end panel defines a second plurality of slots. The first plurality of slots is aligned with the second plurality of slots. Plural battery modules are housed in the housing. The battery modules include plural battery cells having respective first and second edges, and plural heat sinks interleaved between the plural battery cells and in thermal contact with the cells. The heat sinks define a plurality of cooling medium passages having first and second cooling medium passage openings at respective first and second ends of the heat sinks. The first and second ends of the heat sinks extend past the first and second edges of the battery cells. An encapsulant encloses at least a portion of at least one of the battery cells or the heat sinks. The first and second ends of the heat sinks are disposed in the first plurality of slots and in the second plurality of slots, respectively, whereby the battery modules are supported by the slots.

Another embodiment of the invention relates to an energy storage device, which includes a housing, a battery cell housed in the housing, and a heat sink adjacent to the battery cell. The heat sink is in thermal contact with a face of the battery cell. The heat sink defines a plurality of cooling medium passages extending parallel to the face of the battery cell. The cooling medium passages open through the housing. An encapsulant covers at least part of at least one of the battery cell or the heat sink.

Another embodiment of the invention relates to a battery assembly comprising a first energy storage device and a second energy storage device. The first energy storage device has a first plurality of cooling medium passages formed therethrough, and the second energy storage device has a second plurality of cooling medium passages formed therethrough. The first energy storage device and the second energy storage device are positioned with the first and second pluralities of cooling medium passages in mutual alignment such that air may flow through the first and second pluralities of cooling medium passages.

Another aspect of the invention relates to making an energy storage device by stacking a battery cell with an array of heat sinks defining cooling medium passages with a face of the battery cell contacting a face of the corresponding array of heat sinks. The stacked battery cell and heat sinks are then enclosed within a housing having apertures for air flow that are aligned with open ends of the cooling medium passages. In certain aspects, the invention extends to stacking a plurality of battery cells, interleaved with a plurality of arrays of heat sinks. Positive and negative electrodes of the plurality of battery cells are electrically interconnected. An encapsulant is deposited over the electrically interconnected electrodes. In some aspects, power terminals are electrically connected with electrodes of the plurality of battery cells. The power terminals may protrude through the encapsulant.

Another embodiment relates to an energy storage device. The energy storage device comprises a housing having at least one end panel that includes at least one aperture therethrough. The energy storage device further comprises a battery cell housed in the housing. The battery cell has mutually opposed first and second faces joined at edges of the faces. The energy storage device further comprises a heat sink adjacent to the battery cell and in thermal contact with the first face of the battery cell. The heat sink defines at least one cooling medium passage extending parallel to the first face of the battery cell. The cooling medium passage opens onto the at least one aperture formed through the at least one end panel of the housing.

In another embodiment of an energy storage device, the energy storage device comprises a housing having at least one end panel that includes at least one aperture therethrough. The energy storage device further comprises plural battery cells housed in the housing. The battery cells have respective mutually opposed faces joined at edges of the faces. The energy storage device further comprises plural heat sinks in thermal contact with the faces of the battery cells. The heat sinks define a plurality of cooling medium passages extending parallel to the faces of the battery cells. The cooling medium passages open onto the at least one aperture formed through the at least one end panel of the housing.

In another embodiment of an energy storage device, the energy storage device comprises a housing having at least one end panel that includes at least one aperture therethrough. The energy storage device further comprises at least one battery cell housed in the housing. Each battery cell of the at least one battery cell has respective mutually opposed first and second faces joined at edges of the first and second faces. (This does not preclude the presence of other battery cells that do not have mutually opposed first and second faces joined at edges of the first and second faces.) The energy storage device further comprises at least one heat sink. Each heat sink of the at least one heat sink is in thermal contact with one of the first or second faces of a respective adjacent one of the at least one battery cell. (This does not preclude the presence of other heat sinks not in thermal contact with one of the first or second faces of a respective adjacent one of the at least one battery cell.) Each heat sink of the at least one heat sink defines a respective plurality of cooling medium passages extending parallel to said one of the first or second faces of the respective adjacent one of the at least one battery cell. (This does not preclude the presence of other heat sinks that do not define a respective plurality of cooling medium passages extending parallel to said one of the first or second faces of the respective adjacent one of the at least one battery cell.) The cooling medium passages open onto the at least one aperture formed through the at least one end panel of the housing.

In another embodiment of an energy storage device, the energy storage device comprises a housing, a battery cell housed in the housing, and a heat sink. The battery cell has a face. The heat sink is adjacent to the battery cell and is in thermal contact with the face of the battery cell. The heat sink defines a plurality of cooling medium passages extending parallel to the face of the battery cell. The cooling medium passages are rectangular in lateral cross section and open through the housing. (Lateral means in a plane perpendicular to a long axis of the passage.) The energy storage device further comprises an epoxy or other encapsulant covering at least part of at least one of the battery cell and/or the heat sink.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above energy storage device and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An energy storage device comprising:
   a housing comprising opposed first and second end panels, wherein the first and second end panels are substantially parallel to one another, and wherein the first end panel defines a first plurality of slots and the second end panel defines a second plurality of slots, the first plurality of slots aligned with the second plurality of slots;
   plural battery modules housed in the housing, the battery modules comprising:
      plural battery cells having respective first and second side edges; and
      plural heat sinks interleaved between the plural battery cells and in thermal contact with the cells, wherein the heat sinks define a plurality of cooling medium passages having first and second cooling medium passage openings at respective first and second ends of the heat sinks, which extend past the first and second side edges of the battery cells; and
   an encapsulant enclosing at least a portion of at least one of the battery cells or the heat sinks;
   wherein the first and second ends of the heat sinks are disposed in the first plurality of slots and in the second plurality of slots, respectively, whereby the battery modules are supported by the slots;

wherein the first plurality of slots extend entirely through the first end panel and the second plurality of slots extend entirely through the second end panel; and wherein the first and second slots and the plurality of cooling medium passages define passageways that extend entirely through the energy storage device such that air passing through one of the passageways is fluidly isolated from air passing through another of the passageways over an entire transit pathway through the housing.

2. An energy storage device as claimed in claim 1, wherein:

electrodes of the plural battery cells are electrically interconnected in series or in parallel or in combination thereof.

3. An energy storage device as claimed in claim 1, wherein at least one of the plural heat sinks mechanically engages one of the first and second end panels for supporting the plural battery cells within the housing.

4. An energy storage device as claimed in claim 1, wherein the plural heat sinks are aluminum, and the cooling medium passages are rectangular in lateral cross section.

5. An energy storage device as claimed in claim 1, wherein the heat sinks mechanically engage the first plurality of slots and the second plurality of slots, the slots being successively spaced at a distance less than the combined thickness of one of the heat sinks and one of the battery cells, such that at least one of the first and second end panels holds the plural battery cells in compression; and wherein the plural battery cells are compressed to less than about 99% of preassembled thickness.

6. An energy storage device as claimed in claim 1, wherein the battery cells comprise lithium-ion battery cells.

7. An energy storage device as claimed in claim 6, wherein the lithium-ion battery cells comprise lithium-ion pouch cells.

8. An energy storage device as claimed in claim 7, wherein the energy storage device is in an off-highway vehicle.

9. An energy storage device as claimed in claim 6, wherein the energy storage device is in an off-highway vehicle.

10. An energy storage device as claimed in claim 1, wherein the energy storage device is in an off-highway vehicle.

* * * * *